UNITED STATES PATENT OFFICE.

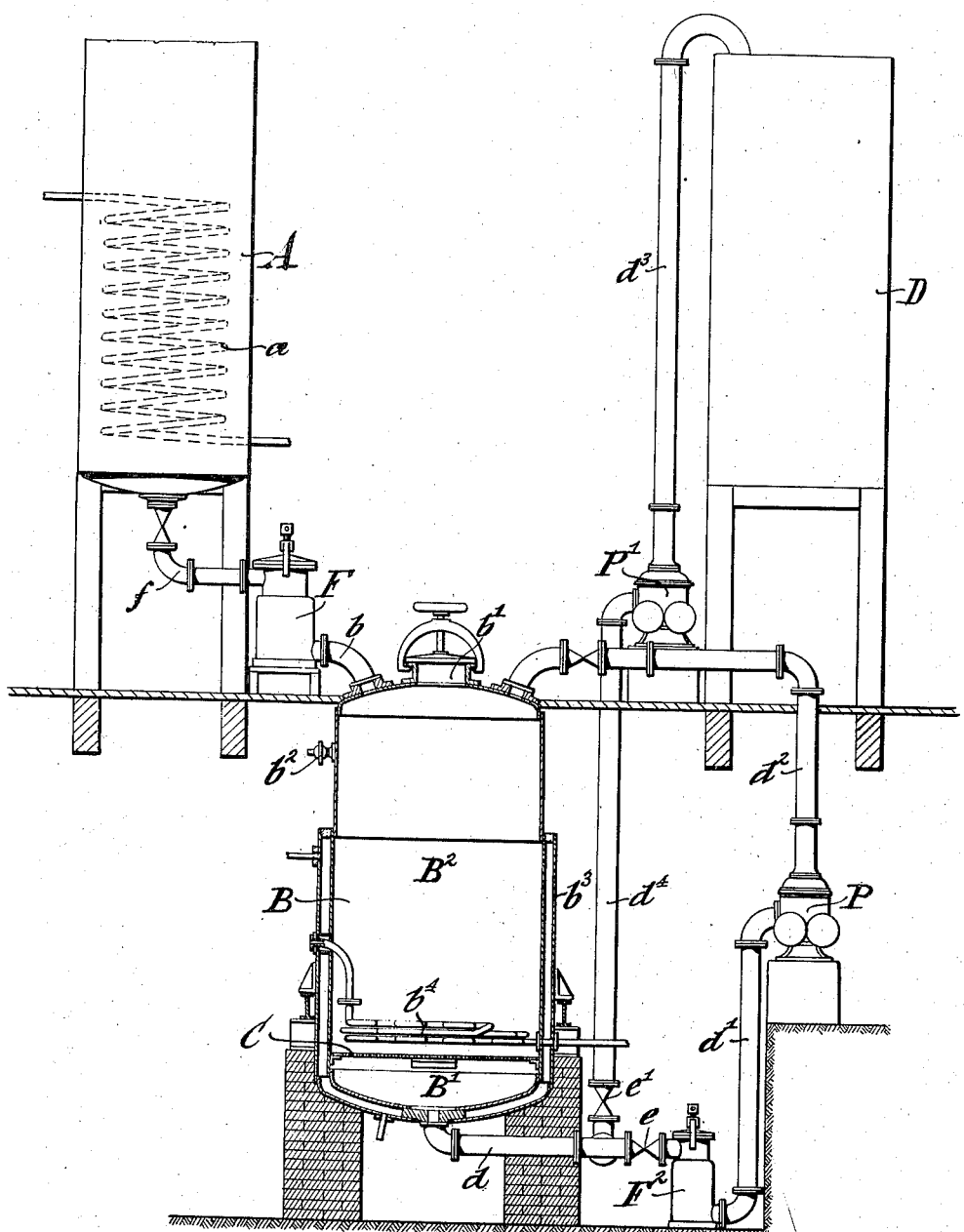

FRITZ ARLEDTER, OF NEW YORK, N. Y., AND HERMAN ARLEDTER, OF GARSTON, ENGLAND.

PROCESS OF MAKING RESIN SIZE.

SPECIFICATION forming part of Letters Patent No. 701,125, dated May 27, 1902.

Application filed January 25, 1902. Serial No. 91,200. (No specimens.)

*To all whom it may concern:*

Be it known that we, FRITZ ARLEDTER, residing in New York, borough of Manhattan, and State of New York, and HERMAN ARLEDTER, residing in Garston, England, subjects of the Emperor of Austria-Hungary, have invented certain new and useful Improvements in Processes of Making Resin Size, of which the following is a specification.

This invention relates to processes of making resin size, and in particular resin size suitable for use in the manufacture of paper. As is well known, the effective agent of such a size is the free or unsaponified resin existing in the size and liberated within the paper during the course of manufacturing the same.

The object of this invention is to provide a process for making a size containing a very high percentage of free resin and, furthermore, to provide a process by which a size containing free resin and a compound of resin—in other words, a resinate—capable of decomposition into a volatile substance and free resin in the course of paper manufacture may be obtained. The invention consists for this purpose in the process of making resin size, which comprises the steps of mixing an oil or fat with a suitable molten resin, filtering the mixture, adding to the same a solution of an ammonium compound and an alkali lye, the latter in sufficient quantity to induce saponification, and agitating the resulting mixture in contact with carbonic-acid gas under conditions permitting saponification of only a part of the resin; and the invention consists, further, of a resin size containing free unsaponified resin, free alkali, and an ammonium resinate.

In the accompanying drawing, which illustrates in side elevation and partly in vertical section an apparatus suitable for carrying on our improved process, A indicates a suitable boiling vessel, which may be heated in any suitable manner—for example, by means of the heating-coil $a$.

F is a filter of suitable construction for filtering a mixture of molten resin and oil and is connected by the pipe $f$ with the boiler A.

B indicates a cooker communicating at its upper portion by a pipe $b$ with the filter F and provided with a manhole $b'$, which is closed by a suitable cover, and with a vent-cock $b^2$ at the upper portion of the cooker. In order to secure thorough heating of the mass treated within the cooker, the same is preferably heated both exteriorly and interiorly, exteriorly by means of a jacket $b^3$ and interiorly by means of a steam-coil $b^4$. The latter is located at the lower portion of the cooker and immediately above a screen C, which divides the cooker laterally into two compartments, an upper and a lower one. From the lower compartment B' a pipe $d$ communicates with a filter $F^2$, from which a pipe $d'$ extends to a suitable force-pump P. From said pump a pipe $d^2$ communicates with the upper compartment $B^2$. A branch pipe $d^4$ is connected at its lower end with the pipe $d$ and at its opposite end with a pump P', and a pipe $d^3$ delivers from the pump P' into a suitable settling-vat D.

The various parts of the apparatus may be supported in any suitable manner, and the various pipes are provided with the necessary valves for carrying out the function of the apparatus.

A quantity of resin is introduced into the boiler A. To the same is added a quantity of oil or fat, either mineral oil—for example, naphtha—or a vegetable oil—for example, palm-oil. The quantity of oil added is in proportion to the quantity of resin and to the nature of the resin and oil employed. The mass is heated to such an extent as to melt the resin, whereby the same dissolves in the oil or fat, the whole forming a liquid mass, which is then allowed to run through the pipe $f$, filter F, and pipe $b$ into the upper compartment $B^2$ of the cooker B. Prior to the admission of this mass into the cooker, however, a quantity of alkali lye has been admitted through the manhole at the upper part of the cooker sufficient to partly fill the lower compartment B'. The lye is employed in approximately the proportion of six per cent. of the weight of the resin. Sodium carbonate is a suitable alkali for the purpose. There is also admitted a solution containing about one per cent. of ammonium carbonate or sal-ammoniac. These two solutions mix in the lower compartment B', and the resin-and-oil mixture is run in on top of them, the same passing through the screen C. The pump P is now started, and the alkali lye, ammonium carbonate or chlorid solution, and resin-and-oil mixture is pumped for about one hour in continuous circulation through the pipe $d$, filter $F^2$, pipe $d'$, pump P, pipe $d^2$, upper compartment $B^2$, screen C, and lower compartment $B'$. During this agitation the mass is continuously heated by means of the steam-coil $b^4$ and the steam-jacket surrounding the cooker B. Under these conditions a portion of the alkali is decomposed, liberating free carbonic-acid gas, which soon establishes within the circulatory system a considerable pressure. Saponification takes place, due to the soda attacking the resin and oil. The increasing pressure, however, retards the decomposition of the alkali and soon reaches the point when no further splitting up of the alkali can take place, and as a consequence the generation of carbonic-acid gas ceases and saponification ceases likewise. The constant circulation through the pump produces an intimate contact of the carbonic-acid gas with the mixture, which becomes heavily charged with carbonic-acid gas. During the circulation the filter $F^2$ removes all impurities. The object to be attained is to render the final product of such a character as to be easily soluble in cold water, but without foaming, and to permit only such saponification within the cooker B as to impart to the size this property—in other words, to leave a large portion of the resin in a free state. This is controlled during the circulation by opening more or less and at the proper times the vent-cock $b^2$ of the cooker, so as the permit escape of carbonic-acid gas. Immediately upon opening said vent-cock the pressure within the circulatory system falls, the decomposition of the alkali sets in, and additional saponification takes place, this action continuing until the pressure again rises, due to the liberation of carbonic-acid gas, to such a point as to stop the decomposition of the alkali. The degree of saponification and the quality of the product may by this means be controlled to a nicety. During the mixing process herein described the ammonium compound is also decomposed. When ammonium carbonate is used, it splits up into free ammonia and carbonic-acid gas. The ammonia attacks the resin and forms an ammonium resinate, while the carbonic-acid gas serves to increase the pressure within the circulatory system. This ammonium resinate is a valuable constituent of the product, for the reason that when paper containing the same is dried and heated the ammonia is disengaged, leaving free resin within the paper. The agitation having been carried on for the period necessary to produce the required reactions and bring the mass to the proper condition, which, as before stated, will ordinarily be about one hour, the mass is allowed to cool sufficiently so that upon exposing the same to atmospheric pressure no further saponification will result. The vent-cock $b^2$ is then opened, the valve $e$ of the pipe $d$ closed, the valve $e'$ of the pipe $d^4$ opened, and the mass pumped by a suitable pump $P'$ through the pipes $d^4$ and $d^3$ into the storage-tank D, from which the same may be removed for use or sale. The product is a resin size of superior quality, containing a large percentage of free unsaponified resin, a quantity of free alkali, and a quantity of ammonium resinate. It is easily soluble in cold water without foaming. It is entirely free from turpentine and is suitable for the manufacture of papers of the highest grade. It does not foam upon the paper-machine.

The process has the advantage that resins of the cheapest grades may be employed, the impurities being removed during the process. The time necessary for cooking is short as compared with other processes.

Having thus described our invention, we claim as new and desire to secure by Letters Patent—

1. The process herein described of making resin size, which consists in mixing an oil or fat with a suitable molten resin, filtering the mixture, adding to the same a solution of an ammonium compound and an alkali lye, the latter in sufficient quantity to induce saponification, and agitating the resulting mixture in contact with carbonic-acid gas under conditions permitting saponification of only a portion of the resin, substantially as set forth.

2. The process herein described of making resin size, which consists in mixing an oil or fat with a suitable molten resin, filtering the mixture, adding to the same a solution of ammonium compound and an alkali lye, the latter in sufficient quantity to induce saponification, and agitating the resulting mixture in contact with carbonic-acid gas and under such heat and pressure as to permit saponification of only a portion of the resin, substantially as set forth.

3. A resin size containing free unsaponified resin, free alkali and an ammonium resinate, substantially as set forth.

In testimony whereof we have signed our names to this specification in the presence of two subscribing witnesses.

FRITZ ARLEDTER.
HERMAN ARLEDTER.

Witnesses as to Fritz Arledter:
  WALTER LANZKE,
  EDWARD P. MACLEAN.
Witnesses as to H. Arledter:
  W. J. SULIS,
  WM. PIERCE.